US007048588B2

(12) United States Patent
Chang

(10) Patent No.: US 7,048,588 B2
(45) Date of Patent: May 23, 2006

(54) MULTIPLE PORT MEMORY CARD CONNECTOR

(75) Inventor: Chia-Chen Chang, Hsin Chung (TW)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/869,570

(22) Filed: Jun. 16, 2004

(65) Prior Publication Data

US 2004/0259422 A1 Dec. 23, 2004

(30) Foreign Application Priority Data

Jun. 17, 2003 (TW) ............................... 92211031 U

(51) Int. Cl.
*H01R 24/00* (2006.01)

(52) U.S. Cl. ..................................... 439/630
(58) Field of Classification Search ............... 439/630, 439/631, 945, 946, 64, 325, 377; 361/737
See application file for complete search history.

(56) References Cited

U.S. PATENT DOCUMENTS

| 5,613,860 | A | * | 3/1997 | Banakis et al. | ............... 439/64 |
|---|---|---|---|---|---|
| 6,623,305 | B1 | * | 9/2003 | Chun-Lung | .................. 439/630 |
| 6,716,066 | B1 | * | 4/2004 | Kuo | ............................ 439/630 |
| 6,749,450 | B1 | * | 6/2004 | Chen | ........................... 439/188 |
| 6,773,308 | B1 | * | 8/2004 | Lwee | ........................... 439/630 |
| 6,857,907 | B1 | * | 2/2005 | Hung et al. | .................. 439/630 |
| 6,872,095 | B1 | * | 3/2005 | Sato et al. | ................... 439/630 |
| 6,926,560 | B1 | * | 8/2005 | Chu | ........................... 439/630 |
| 6,929,513 | B1 | * | 8/2005 | Fan | ............................. 439/630 |

* cited by examiner

*Primary Examiner*—Chandrika Prasad
(74) *Attorney, Agent, or Firm*—Stephen Z. Weiss

(57) ABSTRACT

A memory card connector includes a lower dielectric housing part having a terminal-mounting base and a pair of side wall sections extending forwardly from opposite sides of the base. An upper dielectric housing part is mounted on top of the lower housing part and has a terminal-mounting roof. A card locating plate is connected at opposite sides thereof to the side wall sections of the lower housing part and combines therewith to define a first card-receiving space beneath the plate. The card locating plate is spaced from the roof of the upper housing part and combines therewith to define a second card-receiving space above the plate.

22 Claims, 16 Drawing Sheets

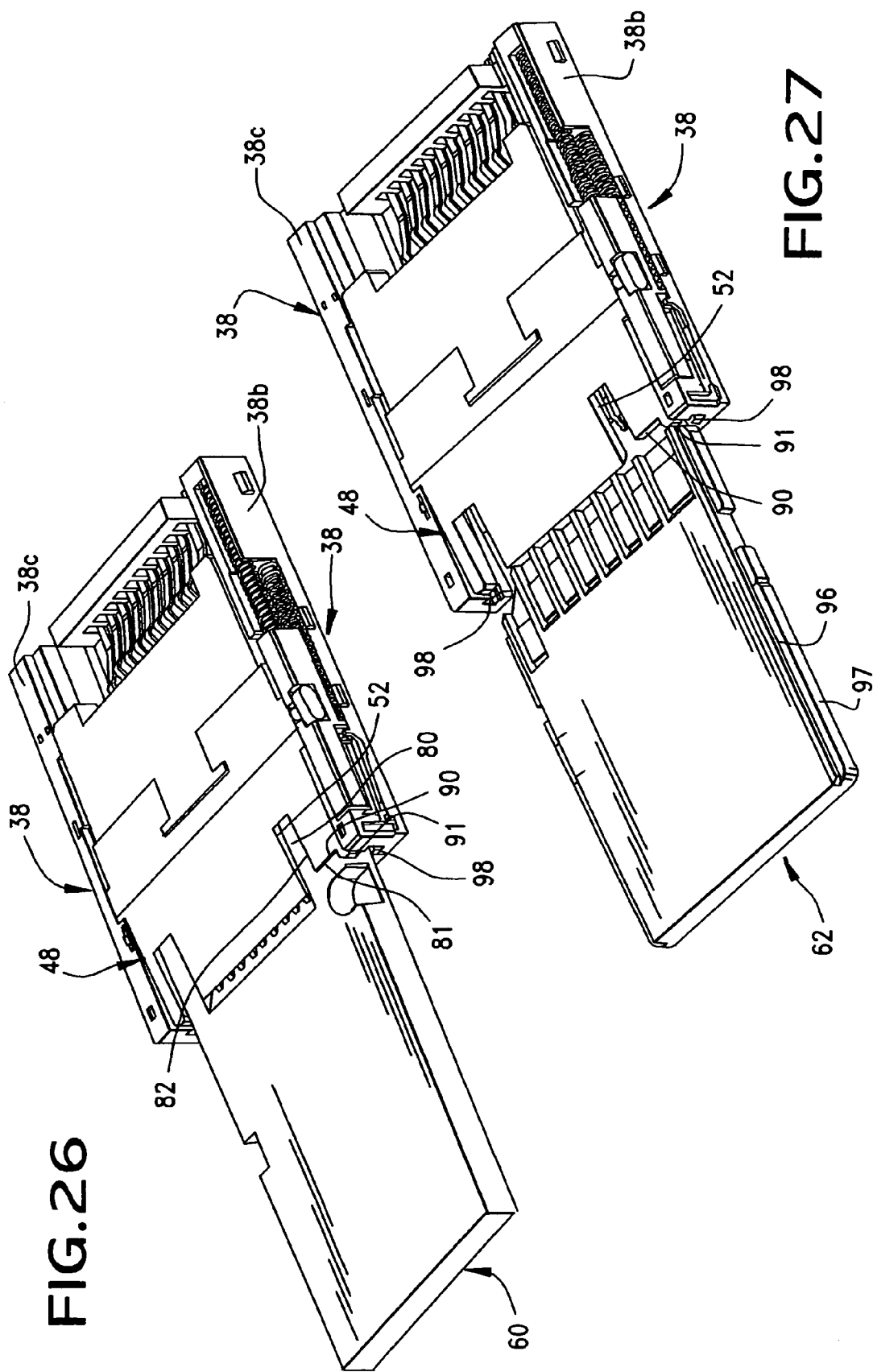

MULTIPLE PORT MEMORY CARD CONNECTOR

FIELD OF THE INVENTION

This invention generally relates to the art of electrical connectors and, particularly, to a memory card connector having multiple ports or card-receiving spaces for not only receiving a plurality of memory cards but different types of cards.

BACKGROUND OF THE INVENTION

Memory cards are known in the art and contain intelligence in the form of a memory circuit or other electronic program. Some form of card reader reads the information or memory stored on the card. Such cards are used in many applications in today's electronic society, including video cameras, digital still cameras, smartphones, PDA's, music players, ATMs, cable television decoders, toys, games, PC adapters, multi-media cards and other electronic applications. Typically, a memory card includes a contact or terminal array for connection through a card connector to a card reader system and then to external equipment. The connector readily accommodates insertion and removal of the card to provide quick access to the information and program on the card. The card connector includes terminals for yieldingly engaging the contact array of the memory card.

A typical memory card connector includes some form of dielectric housing which is covered by a metal shell. The metal shell may be stamped and formed of sheet metal material and formed substantially into a box-shape. The metal shell and the housing combine to define a card-receiving cavity. One end of the cavity is open to form a card-insertion opening. The dielectric housing may be generally L-shaped or U-shaped and includes a rear terminal-mounting section at the rear of the cavity, and a longitudinal side wall section extends forwardly from one or both ends of the rear section at one or both sides of the cavity. The contacts or terminals of the connector are mounted on the rear section. The metal shell has a top plate substantially covering the dielectric housing, with side plates extending downwardly over the side wall sections of the housing. The side plates of the metal shell and/or the side wall sections of the housing define the sides of the card-receiving cavity.

The memory card connector often is mounted on the top surface of a printed circuit board, and solder tail portions of the terminals are connected, as by a reflow soldering process, to appropriate circuit traces on the board. The connector often includes some form of eject mechanism to facilitate ejecting a memory card from the card-receiving cavity of the housing. The eject mechanism often is mounted on one of the side wall sections of the L-shaped or U-shaped housing.

FIG. 1 shows a memory card connector, generally designated 26, according to the prior art and generally as described above. The connector includes a dielectric housing, generally designated 28, which includes a rear terminal-mounting section 28a and a pair of side wall sections 28b and 28c extending forwardly from opposite ends of the rear section to define a receiving space 30 for receiving a memory card inserted thereinto in the direction of arrow ▯A▯. A plurality of conductive terminals, generally designated 32, are mounted on rear section 28a of housing 28. The housing is adapted for mounting on a printed circuit board, and the terminals have tail portions 32a for electrical connection to appropriate circuit traces on the printed circuit board. An eject mechanism, generally designated 34, is mounted on side wall section 28c. The eject mechanism has an ejector arm 34a reciprocal in the direction of double-headed arrow ▯B▯ to facilitate ejecting the memory card from receiving space 30. A metal shield or cover (not shown) may be mounted over the top of housing 28, with the cover having a top wall spanning side wall sections 28b and 28c of the housing. Therefore, the top wall of the cover and the side wall sections of the housing, along with rear section 28a of the housing, define a substantially enclosed card-receiving cavity corresponding to receiving space 30 above the printed circuit board.

Conventional memory card connectors as described above in relation to the prior art connector of FIG. 1 have a single card-receiving space 30 for receiving a single memory card. The present invention is directed to providing a memory card connector having multiple ports or multiple card-receiving spaces. The multiple ports or spaces not only receive multiple memory cards but memory cards of different types.

SUMMARY OF THE INVENTION

An object, therefore, of the invention is to provide a new and improved memory card connector of the character described.

In the exemplary embodiment of the invention, a memory card connector includes a lower dielectric housing part having a terminal-mounting base and a pair of side wall sections extending forwardly from opposite sides of the base. An upper dielectric housing part is mounted on top of the lower housing part and has a terminal-mounting roof. A card locating plate is connected at opposite sides thereof to the side wall sections of the lower housing part and combines therewith to define a first card-receiving space beneath the plate. The card locating plate is spaced from the roof of the upper housing part and combines therewith to define a second card-receiving space above the plate.

According to one aspect of the invention, the terminal-mounting base of the lower housing part includes a base plate mounting a first group of terminals on the top thereof between the side wall sections of the housing for engaging appropriate contacts on a first memory card inserted into the first card-receiving space. The terminal-mounting roof of the upper housing part mounts a second group of terminals for engaging appropriate contacts on a second memory card inserted into the second card-receiving space. As disclosed herein, the base plate of the first housing part mounts two different groups of terminals for engaging appropriate contacts on two different types of memory cards.

According to another aspect of the invention, the card locating plate is pivotally mounted at opposite sides thereof to the side wall sections of the housing. Specifically, the plate includes a pair of pivot bosses projecting from opposite sides thereof into a pair of respective pivot notches in the side wall sections of the housing. The pivot notches are elongated in a direction transversely of the card locating plate, whereby the plate not only pivots relative to the housing, but the plate also moves bodily in the transverse direction.

According to a further aspect of the invention, a cover embraces the upper housing part and is mounted to the lower housing part to hold the upper part on the lower part. In the preferred embodiment, the cover is of metal material and is provided as a shield for the connector.

Another feature of the invention is the provision of a card eject mechanism on one of the side wall sections of the lower housing part. The eject mechanism includes a movable slide member, and the card locating plate is coupled to the slide member for movement therewith, whereby the card locating plate can perform a function as a card ejection plate.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 26 is a perspective view of a memory card connector incorporating the card locating plate of FIG. 25 and receiving an MS-type memory card in an incorrect orientation;

FIG. 27 is a view similar to that of FIG. 26, with the connector receiving an S747D-type memory card in an incorrect orientation.

DETAILED DESCRIPTION OF THE PREFERRED EMBODIMENTS

Figure 1:
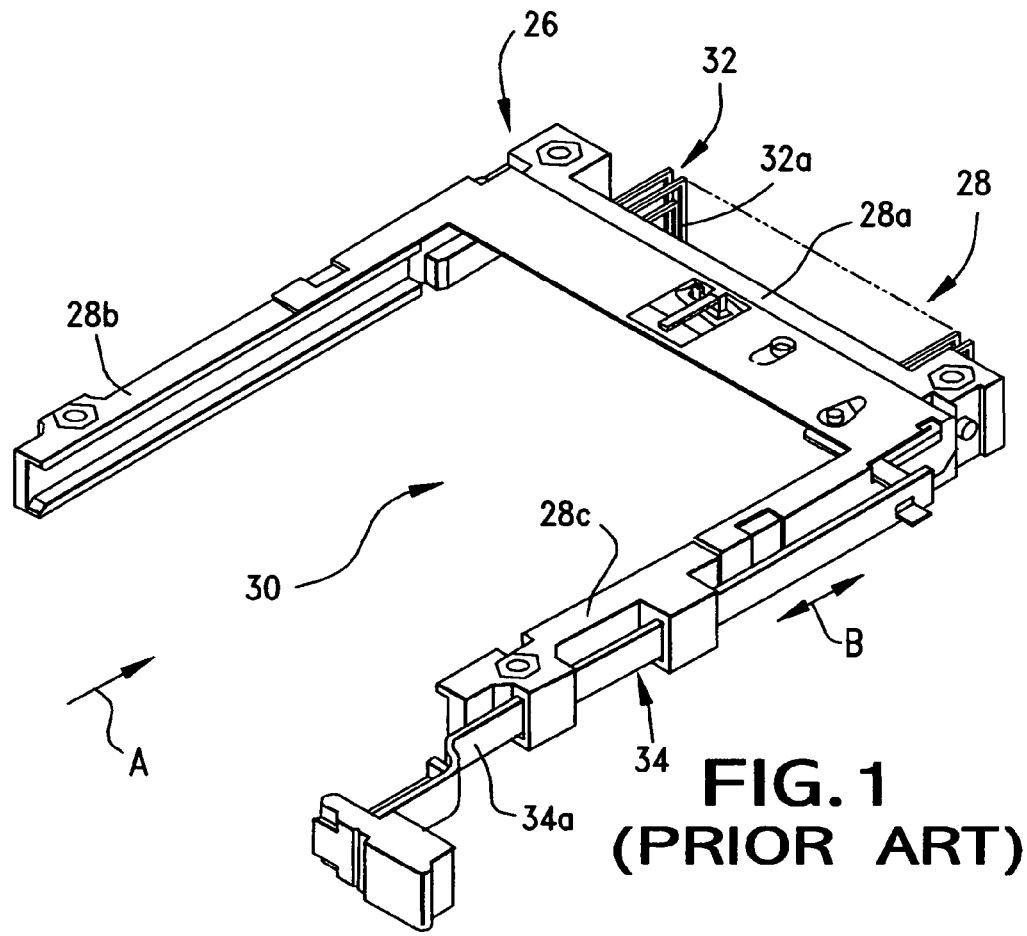
FIG. 1 is a perspective view of a conventional memory card connector of the prior art as described in the Background, above.
Figure 4:
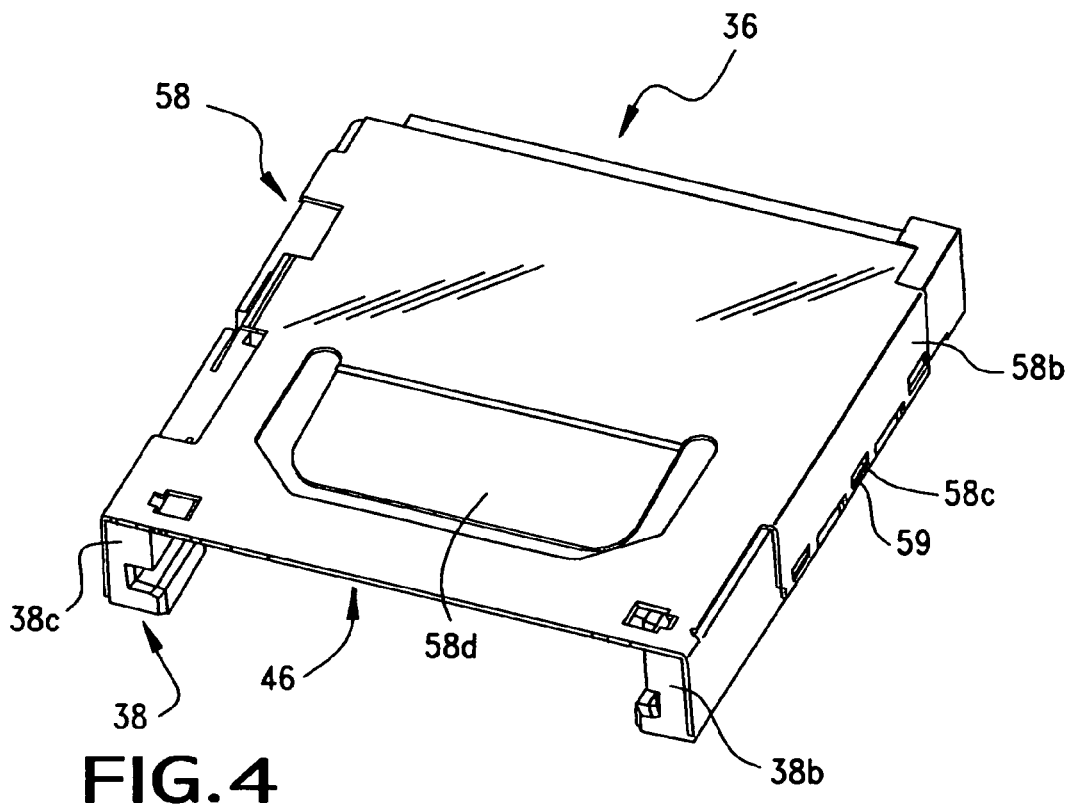
FIG. 4 is a top perspective view of the connector of FIGS. 2 and 3 in assembled condition.
Figure 2:
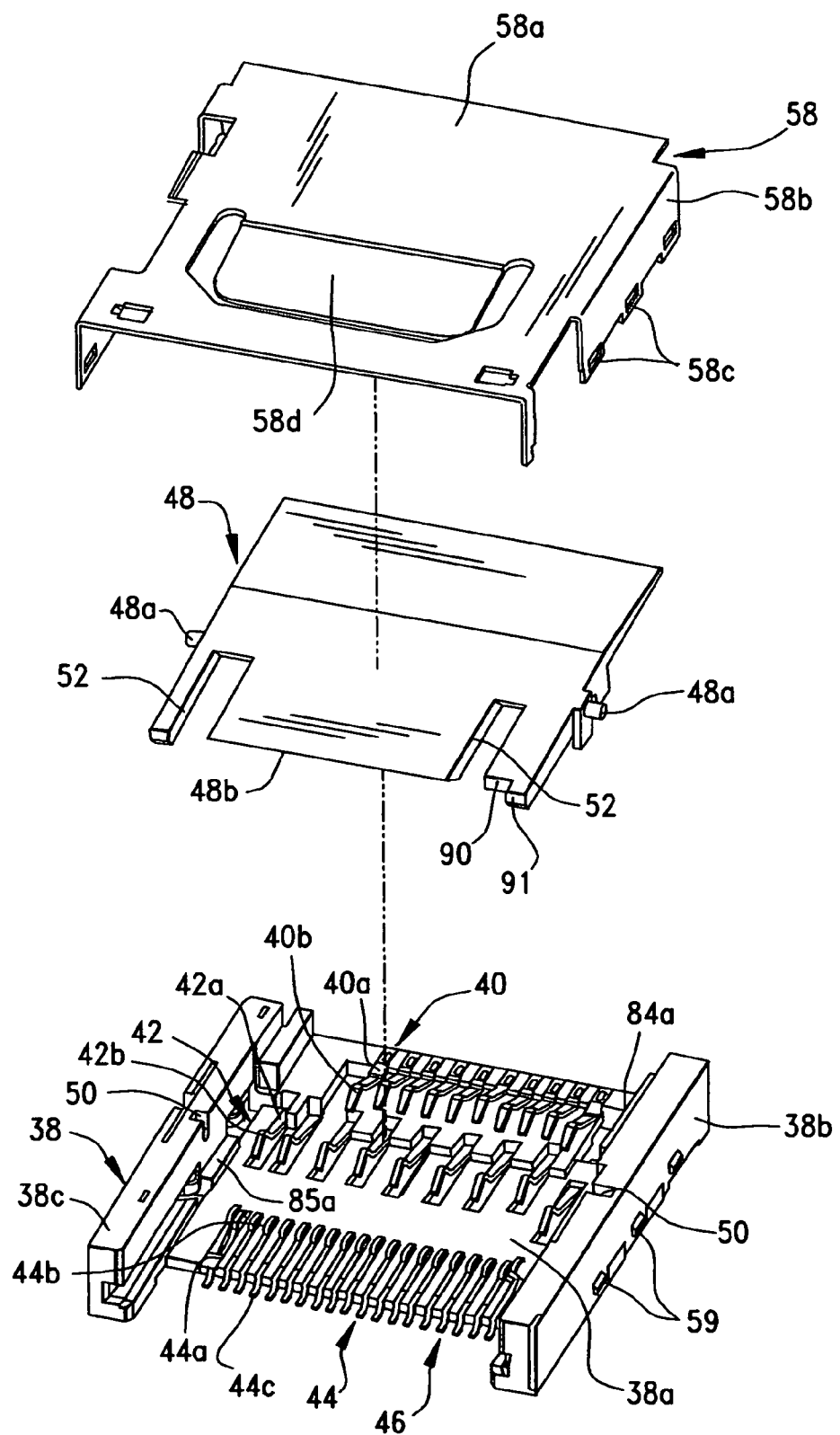
FIG. 2 is an exploded top perspective view of a memory card connector according to a first embodiment of the invention.
Figure 3:
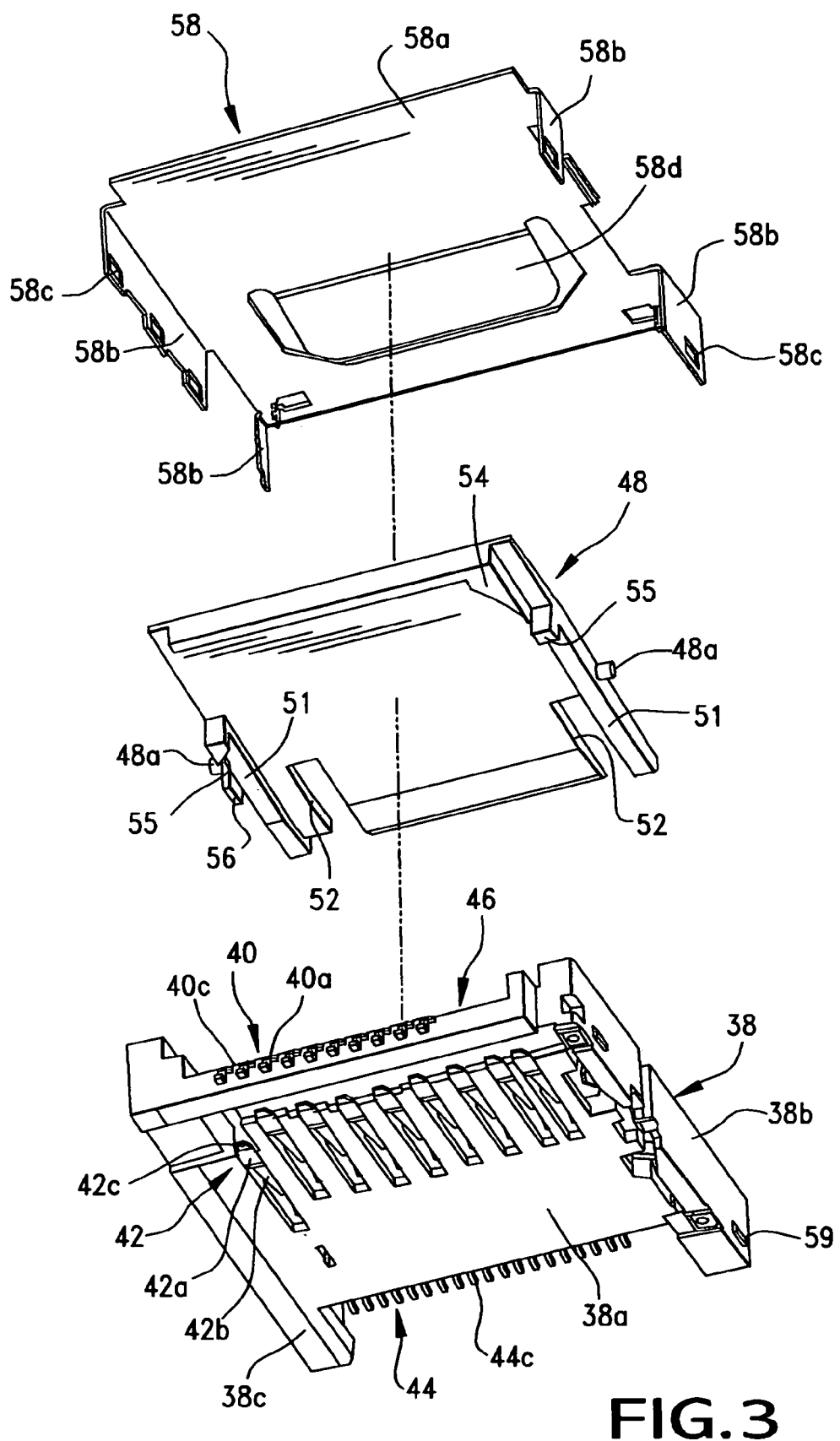
FIG. 3 is an exploded bottom perspective view of the first embodiment.

Referring to the drawings in greater detail, and first to FIGS. 2–4, a first embodiment of a memory card connector, generally designated 36 (FIG. 4), includes a dielectric housing, generally designated 38. The housing includes a base plate 38a spanning a pair of side wall sections 38b and 38c. The housing is molded of dielectric plastic material. A first group of conductive terminals, generally designated 40; a second group of conductive terminals, generally designated 42; and a third group of conductive terminals, generally designated 44 all are mounted in three rows on base plate 38a of the housing. The three groups of terminals are arranged in linear rows across the base plate, with the first group 40 being at the rear of the connector, the third group 44 being at the front of the connector and the second group 42 being in a line or row between the first and third groups, as can be seen clearly in FIG. 2. The first group of terminals has a plurality of individual terminals 40a, the second group of terminals has a plurality of individual terminals 42a and the third group of terminals has a plurality of individual terminals 44a. All of the terminals may be stamped and formed of conductive sheet metal material.

Dielectric housing 38 defines a card receiving space, generally designated 46, above base plate 38a and between side wall sections 38b and 38c. Terminals 40a have contact portions 40b; terminals 42a have contact portions 42b and terminals 44a have contact portions 44b. All of the contact portions are exposed or bent upwardly into the card receiving space 46 for engaging contacts on different types of memory cards, as will be seen hereinafter.

Dielectric housing 38 is adapted for mounting on a printed circuit board. Terminals 40a have tail portions 40c (FIG. 3); terminals 42a have tail portions 42c and terminals 44a have tail portions 44c. The tail portions of the terminals are connected, as by soldering, to appropriate circuit traces on the printed circuit board.

Still referring to FIGS. 2–4, a card locating plate, generally designated 48, has a pair of pivot posts 48a which project outwardly from opposite side edges of the plate. The pivot posts are positionable into a pair of pivot notches 50 in side wall sections 38b and 38c of the dielectric housing. This pivotally mounts the locating plate to the housing above card received space 46. In other words, the bottom of the card receiving space is defined by base plate 38a of the housing, and the top of the card receiving space is defined by locating plate 48, whereby a memory card is inserted into the connector between the base plate and the locating plate. The plate has a pair of guide rails 51 on opposite sides or edges thereof. As best seen in FIG. 3, the underside of the locating plate has a first stop element 54, a pair of second stop elements 55 and a third stop element 56. The plate may be molded of plastic material.

Pivot notches 50 are vertically elongated, i.e., in a direction transversely of the card locating plate. Therefore, the plate not only pivots but moves bodily in the transverse direction.

As will be seen hereinafter, the connector includes an eject mechanism, and card locating plate 48 performs a function of being an ejection plate. In those embodiments, first stop element 54, second stop elements 55 and third stop element 56 all become ejection elements of different types of memory cards.

Still referring to FIGS. 2–4, a metal to cover, generally designated 58, includes a top plate 58a and a plurality of depending side walls 58b. The cover is stamped and formed of sheet metal material to form a shielding shell when the cover is positioned over housing 38 as seen in FIG. 4. The side walls of the cover include a plurality of latch openings 58c which ⬜snap⬜into latching engagement with a plurality of chamfered latch bosses 59 protruding from the outsides of side wall sections 38b and 38c of the housing. This latches the cover to the housing as seen in FIG. 4. Finally, the metal top cover has an inwardly or downwardly bent, spring biasing flange 58d for biasingly engaging the top of card locating plate 48 near the front edge 48b thereof. In essence, spring biasing flange 58d engages the top front of the locating plate and pivots the plate downwardly about pivot posts 48a of the locating plate. When a memory card is inserted into card receiving space 46, this biases the card downwardly and pushes the contacts of the card into engagement with one of the groups of terminals 40, 42 or 44.

With card locating plate 48 being pivotally/movably mounted to housing 38 by means of pivot posts 48a being pivotally and vertically movable within pivot notches 50, the plate allows the connector to accommodate memory cards of different thicknesses. In other words, as a particular memory card is inserted into card receiving space 46, spring biasing flange 58d of top cover 58 pushes the plate downwardly onto the top of the card. If the card is relatively thick, the card can bias the plate upwardly against the spring biasing flange. If the card is relatively thin, the spring biasing flange effectively pushes the plate downwardly onto the card and pushes the contacts of the card into engagement with the proper terminals mounted on base plate 38a of housing 38.

Figure 5A:
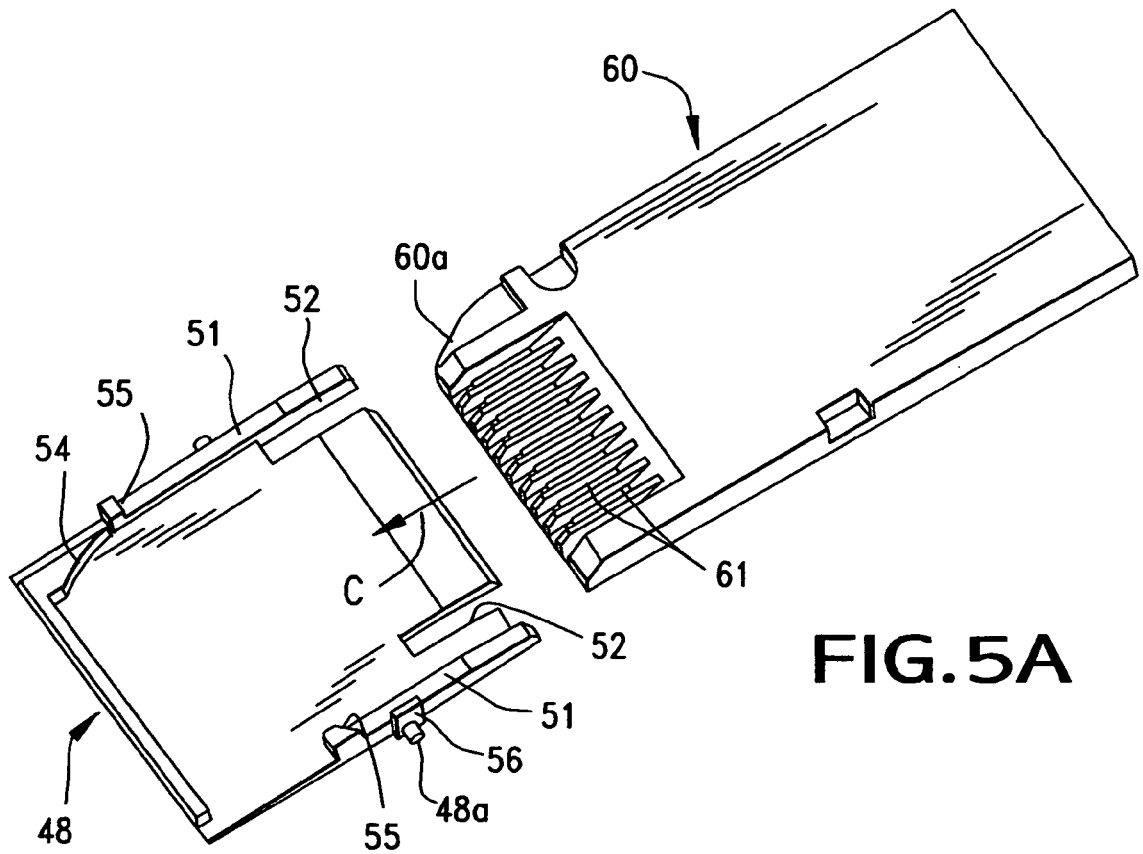
FIG. 5A is a perspective view of the card locating plate of the connector in conjunction with an MS-type memory card.
Figure 5B:
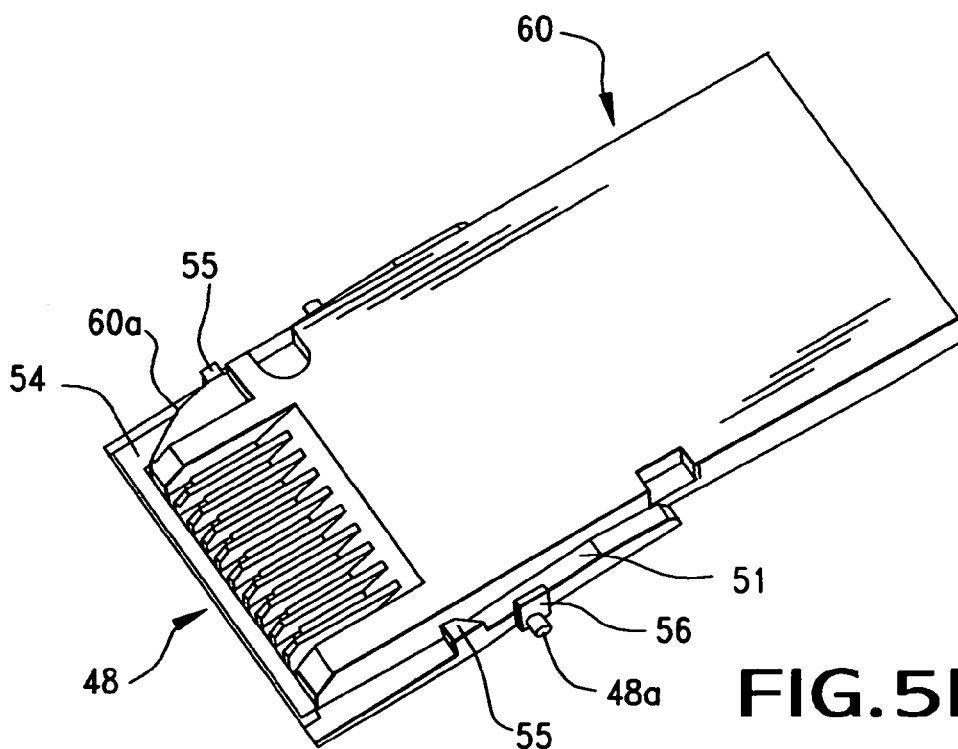
FIG. 5B is a perspective view of the MS-type memory card inserted into the card locating plate.

FIGS. 5A and 5B shows an MS-type memory card, generally designated 60, inserted into card locating plate 48 in the direction of arrow ⬜C⬜(FIG. 5A). When fully inserted, a front edge 60a of card 60 engages first stop element 54 of the locating plate as seen in FIG. 5B. This positions contacts 61 on the underside of the card in proper locations for engaging the first group of terminals 40 at the rear of base plate 38a of connector housing 38 as seen best in FIG. 2.

Figure 6A:
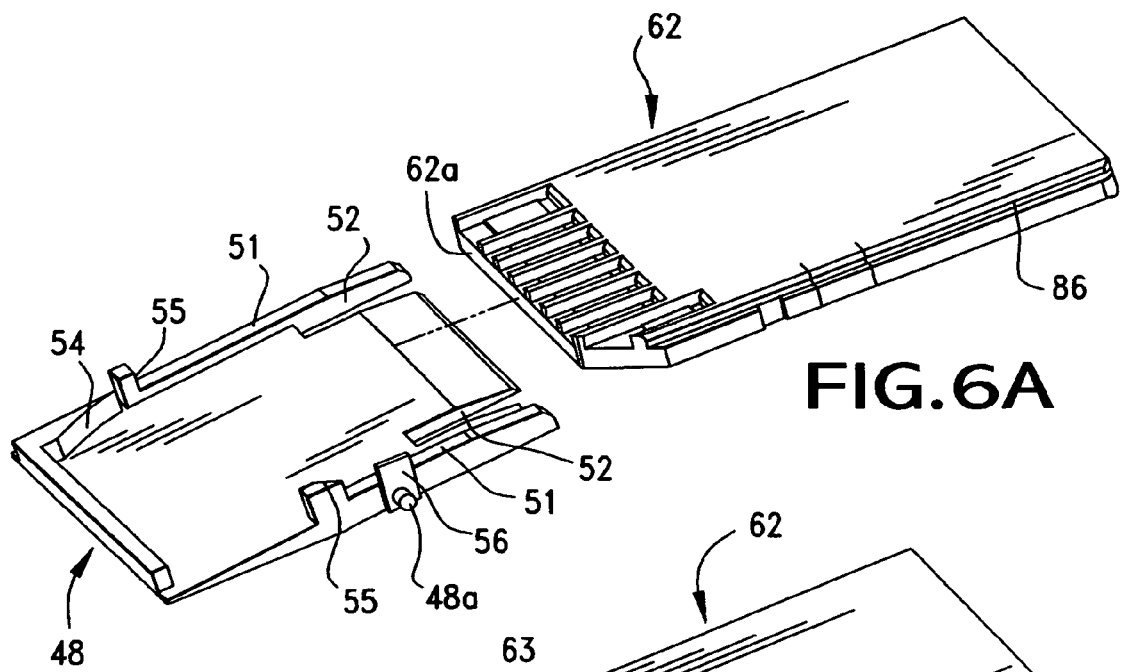
FIGS. 6A and 6B are views similar to that of FIGS. 5A and 5B, respectively, but showing an SD-type memory card.
Figure 6B:
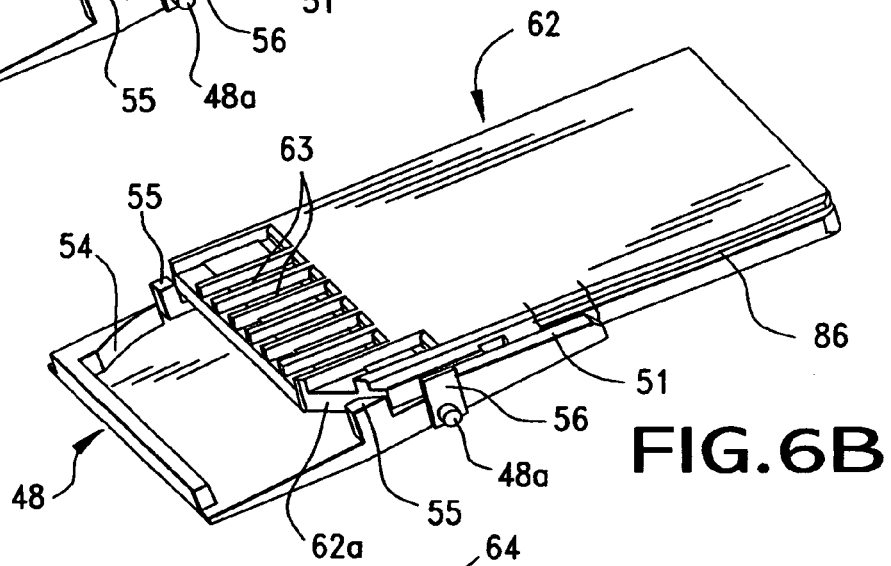

FIGS. 6A and 6B show an SD-type memory card, generally designated 62, inserted into card locating plate 48 in the direction of arrow ⬜D⬜(FIG. 6A). When fully inserted, a front end 62a of card 62 abuts against second stop elements 55 as seen in FIG. 6B. This positions contacts 63 on the underside of the card in proper locations for engaging the second group of terminals 42 on base plate 38a of housing 38.

Figure 7B:
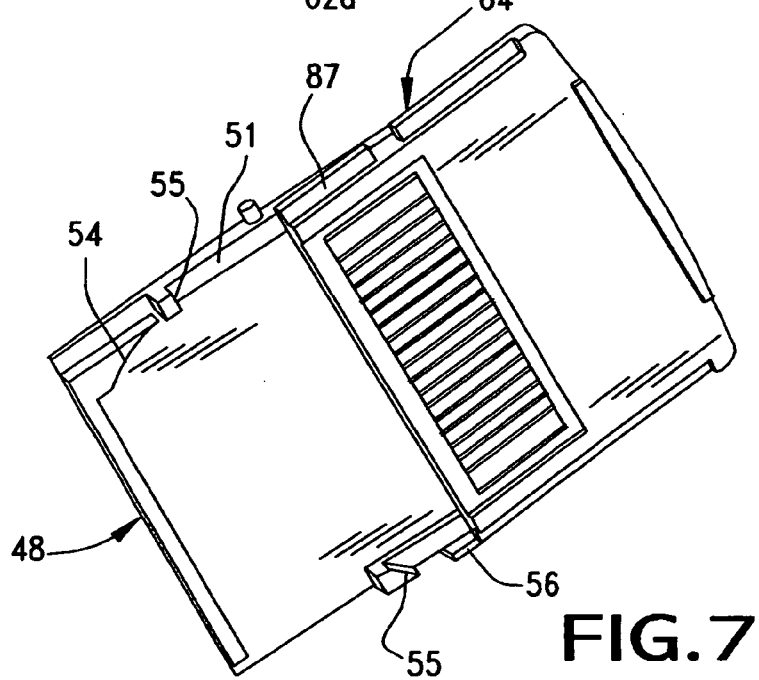
FIGS. 7A and 7B are views similar to that of FIGS. 5A and 5B, respectively, but showing an XD-type memory card.
Figure 7A:
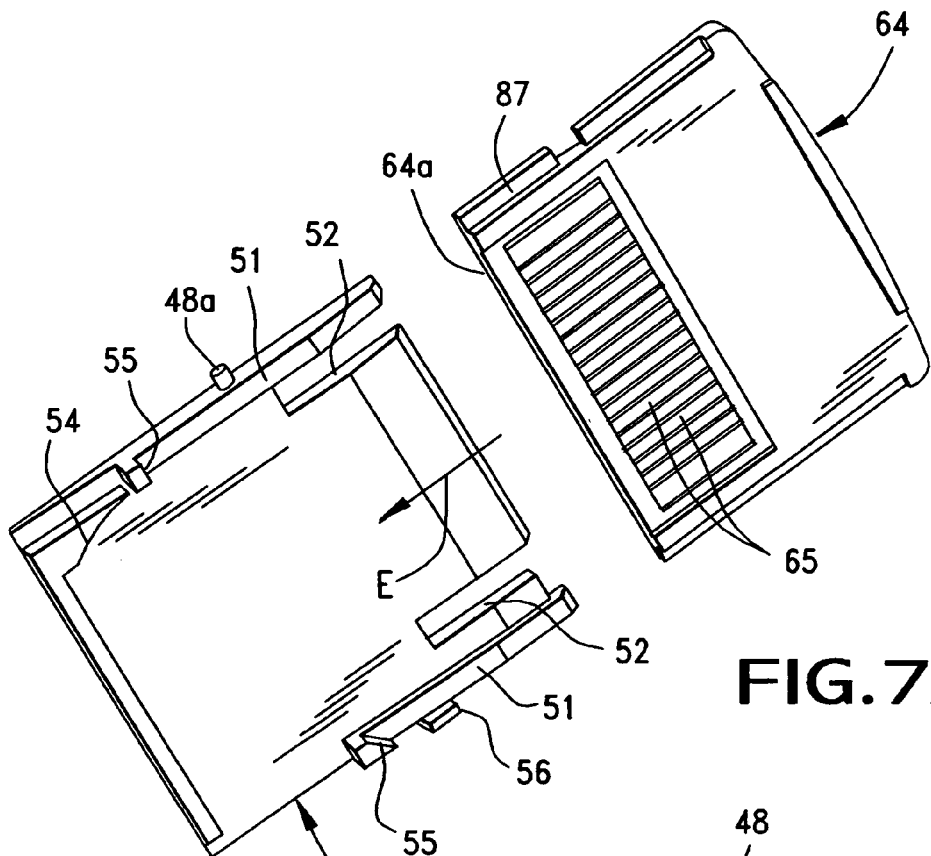

FIGS. 7A and 7B show an XD-type memory card, generally designated 64, inserted into card locating plate 48 in the direction of arrow ⬜E⬜(FIG. 7A). When fully inserted, a front end 64a of the card engages third stop element 56. This positions contacts 65 on the underside of the card in proper locations for engagement with the third group of terminals 44a on base plate 38a of housing 38.

MS-type, SD-type and XD-type memory cards are different standard memory cards in the industry. The cards have different sizes, configurations and number and spacings of terminals.

Figure 8:
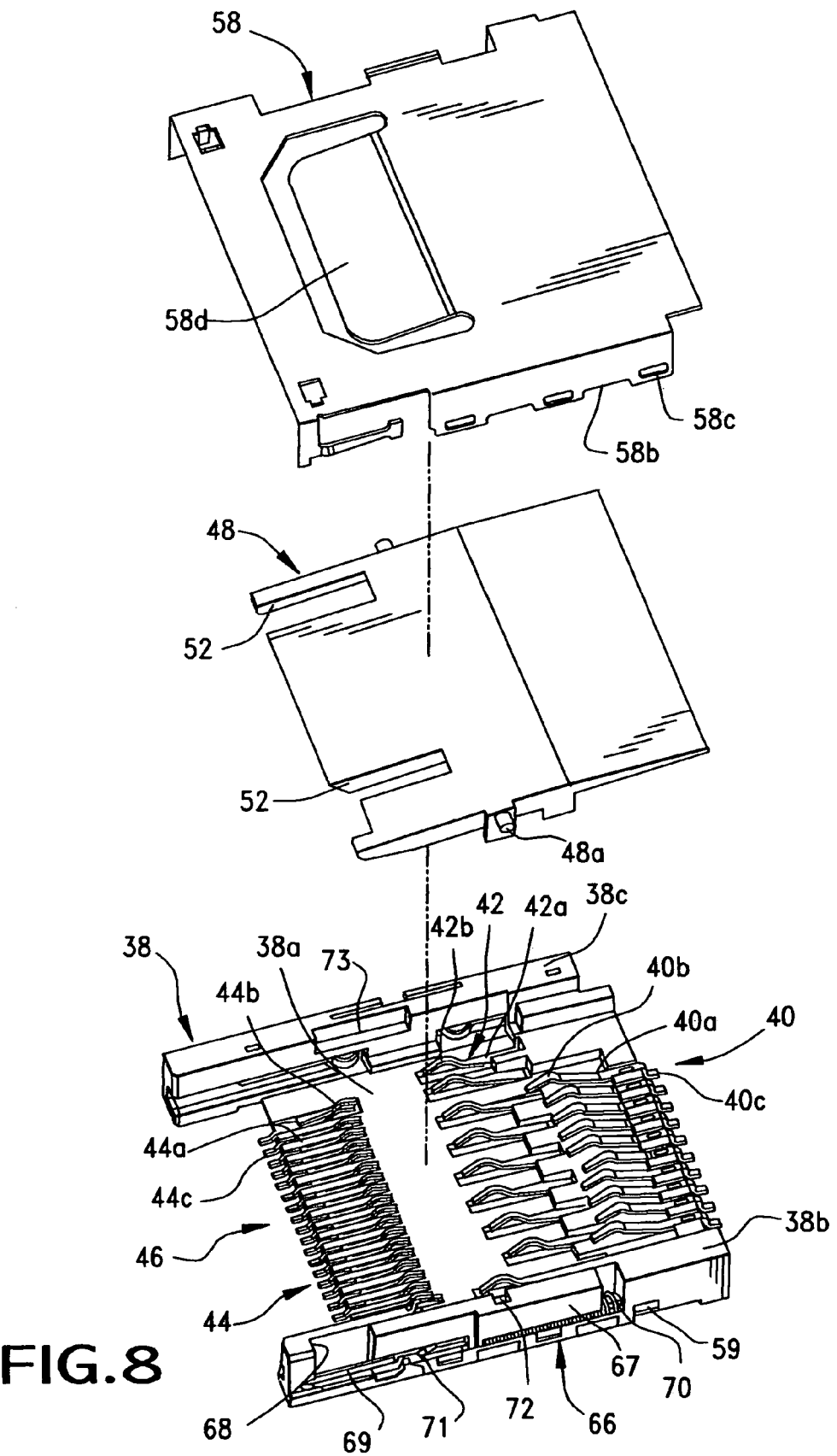
FIGS. 8 and 9 are views similar to that of FIGS. 2 and 3, respectively, but of a second embodiment of the invention.
Figure 9:
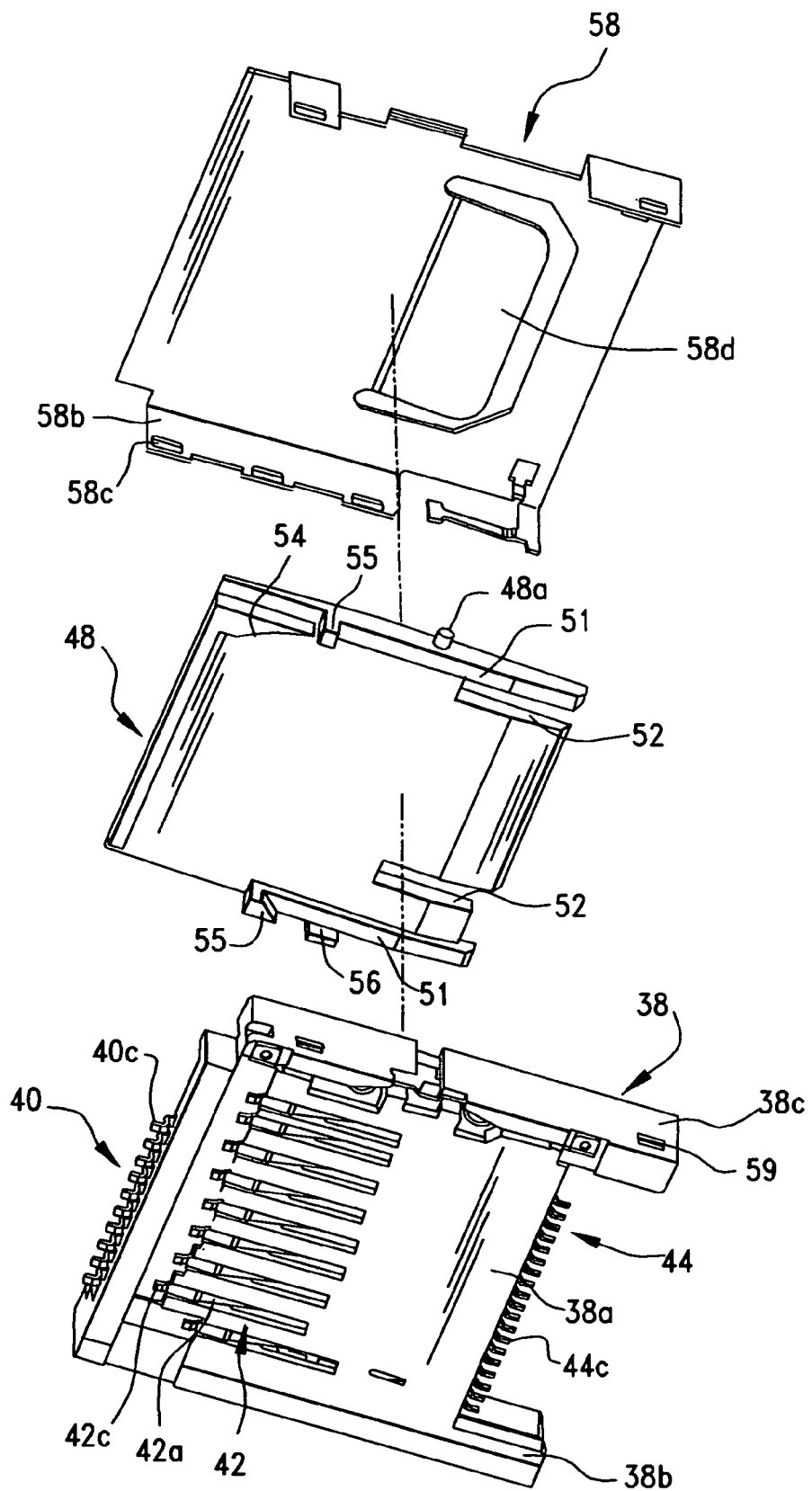

FIGS. 8 and 9 show a second embodiment of the invention, and like reference numerals are applied to indicate the same or similar components as described above in relation to the first embodiment, where applicable. The second embodiment includes a card eject mechanism, generally designated 66, slidably mounted in a recess 68 in the outside of side wall section 38b of housing 38. The eject mechanism includes a guide member 69, and an ejector element or slide member 67 which is spring loaded by a coil spring 70. The guide member engages a curved cam groove 71. A pivot notch 72 is formed in the top of ejector element 67. One of the pivot posts 48a of card locating plate 48 is positioned into pivot notch 72, while the other pivot post on the opposite side of the locating plate is slidably positioned in an elongated recess 73 on the inside of side wall section 38c of the housing. A front end of guide member 69 is fixed to side wall section 38b, while an opposite end of the guide member rides in cam groove 71. The guide member moves in two parts of the curved cam groove for card insertion and card rejection, respectively. With one of the pivot posts 48a of card locating plate 48 being positioned in notch 72 of the ejector element or slide member 70, the locating plate moves with the ejector element. Therefore, locating plate 48, in the second embodiment of the invention, becomes an operative ejector plate.

Figure 10:
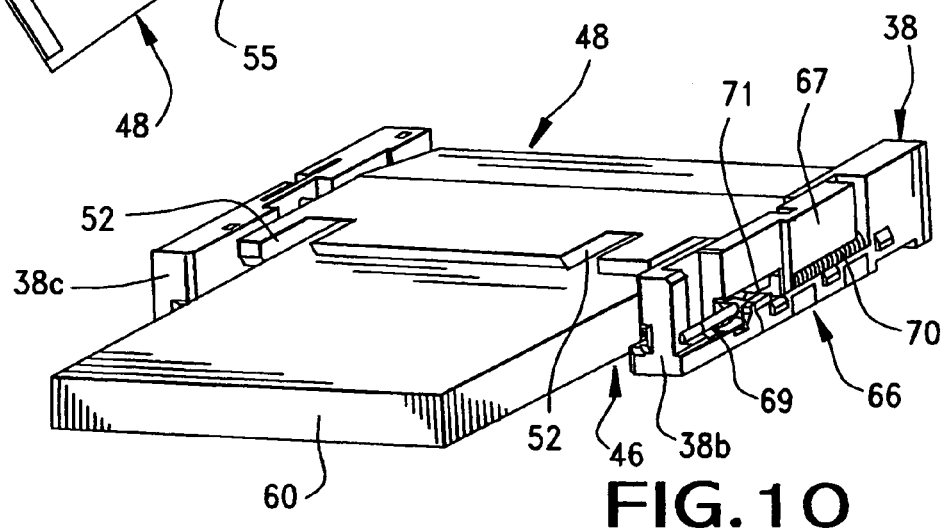
FIG. 10 is a perspective view of the second embodiment with the cover removed and with an MS-type card inserted thereinto.
Figure 11:
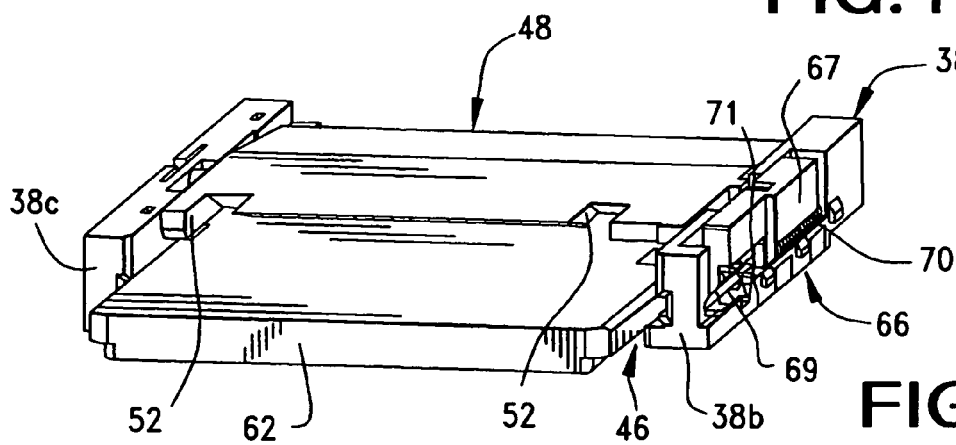
FIG. 11 is a view similar to that of FIG. 10, with an SD-type card inserted into the connector.
Figure 12:
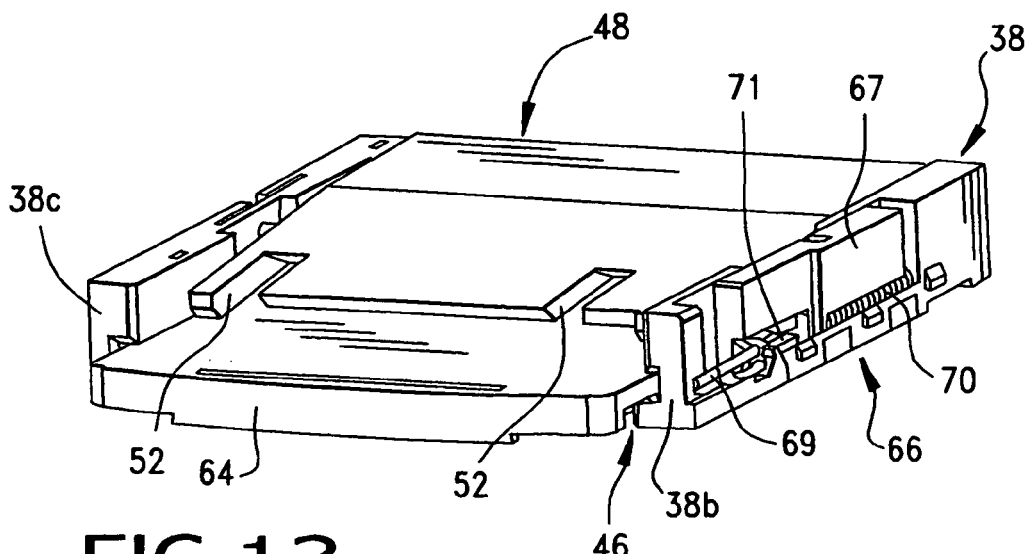
FIG. 12 is a view similar to that of FIG. 10, with an XD-type card inserted into the connector.

Referring to FIGS. 10–12, card locating/ejector plate 48 is slidably movable with ejector element 67 of eject mechanism 66. When an operator inserts one of the memory cards 60, 62 or 64 into the card receiving space 46, the memory card engages its respective stop element 54, 55 or 56 on the plate to, thereby, move the plate and drive ejector element 67 of eject mechanism 66 slidably backward. When the card(s) 60, 62 or 64 is fully inserted into the connector, the stop elements on card locating plate 48 align the contacts of the respective card with its respective terminal group 40, 42 or 44. During this operation, guide member 69 of eject mechanism 66 moves in cam groove 71 to hold the card in its fully inserted position. When the user desires to eject the respective memory card, the user pushes on the card a second time, whereby coil spring 70 is effective to drive ejector element 68, ejector plate 48 and the respective memory card back outwardly of the connector. These types of ⬜push-push⬜eject mechanisms are known in the art and cam groove 71 effectively is in a ⬜heart-shaped⬜configuration.

Figure 15:
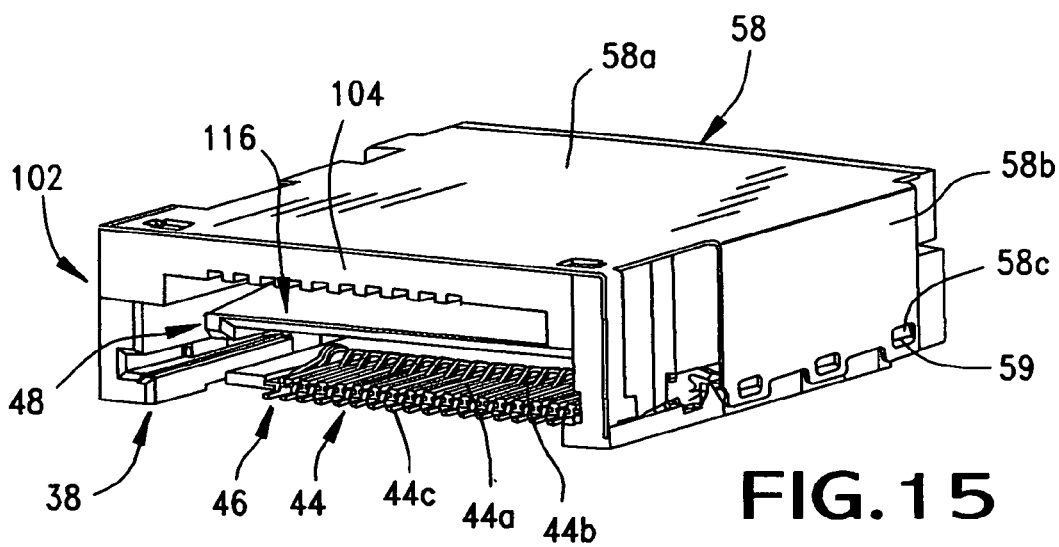
FIG. 15 is a perspective view of the connector of FIGS. 13 and 14 in assembled condition.
Figure 13:
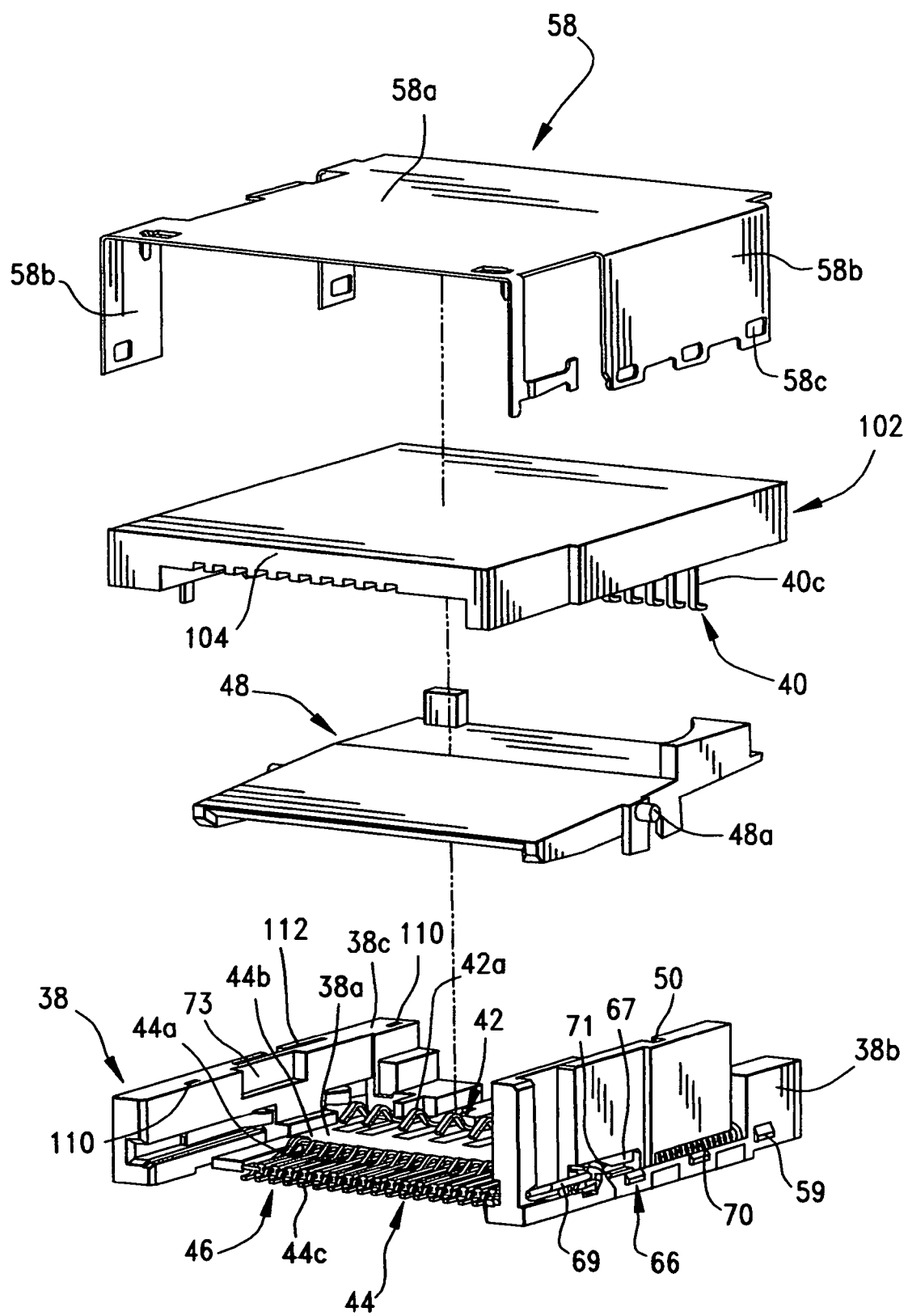
FIG. 13 is an exploded perspective view of a third embodiment having multiple ports or card-receiving spaces for receiving multiple memory cards.
Figure 14:
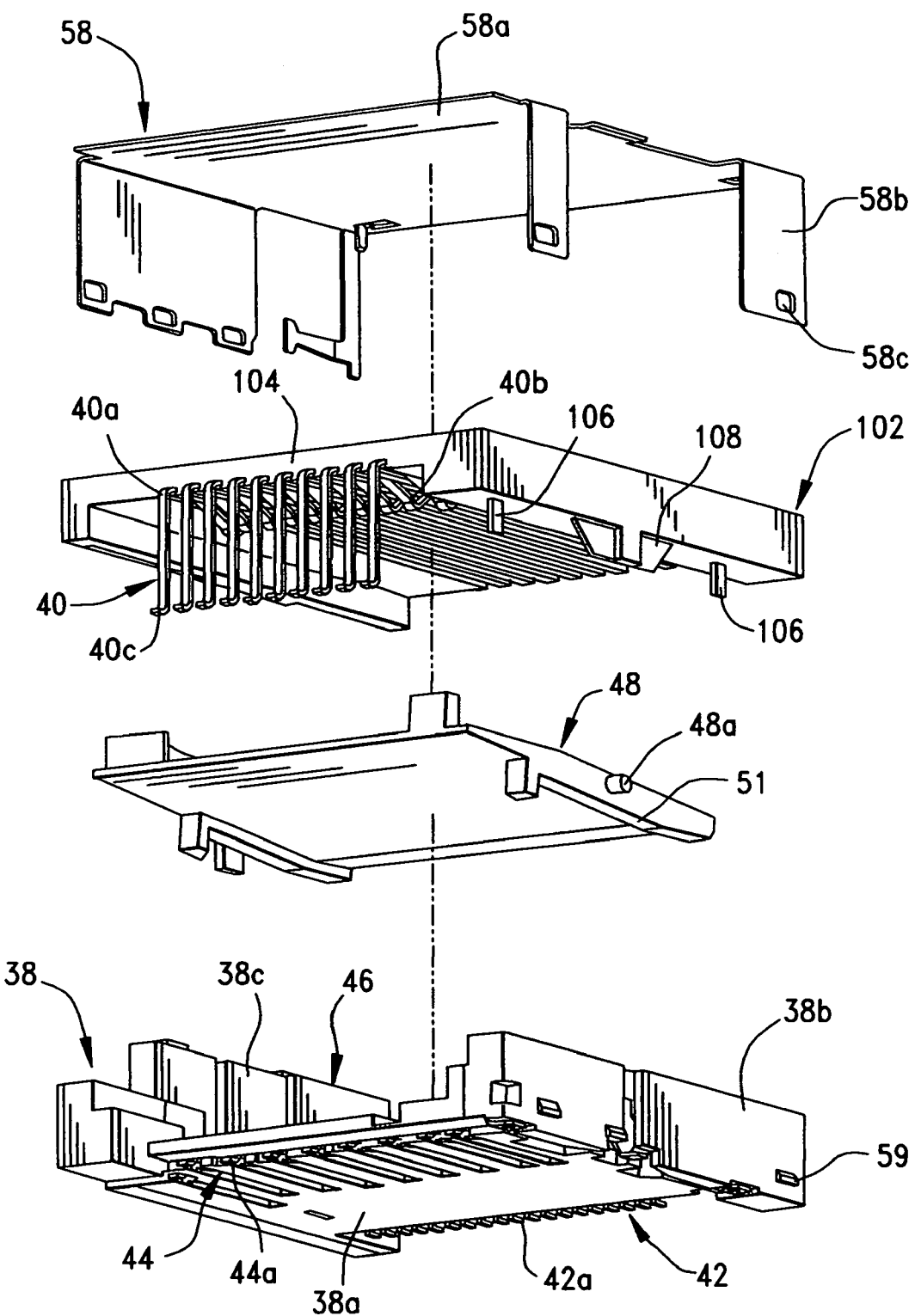
FIG. 14 is an exploded perspective view looking upwardly toward the bottom of the depiction in FIG. 13.

FIGS. 13–15 show an embodiment of the invention wherein the memory card connector includes multiple ports or card-receiving spaces for receiving multiple memory cards of different types. Again, like reference numerals have been applied wherever possible to designate like components described above in the previous embodiment.

With those understandings, the housing of the embodiment in FIGS. 13–15 is a two-part structure. Specifically, housing 38 now becomes a lower housing part for pivotally mounting card locating plate 48 in conjunction with an eject mechanism mounted on side wall section 38b of the lower housing part. A difference in the embodiment of FIGS. 13–15 is that only group 42 of terminals 42a and group 44 of terminals 44a are mounted on base plate 38a of the housing.

An upper dielectric housing part, generally designated 102, includes a roof 104 which mounts the first group 40 of terminals 40a on the underside thereof as best seen in FIG.

14. The tail portions 40c of terminals 40a are lengthened so that they extend all the way down past the lower housing part for connection to the printed circuit board. As seen in FIG. 15, upper housing part 102 is mounted on lower housing part 38. The upper housing part has a pair of positioning pins 106 and a positioning flange 108 that are positioned into a pair of positioning holes 110 and a positioning slot 112 in the top surface of side wall section 38c.

The side walls 58b of cover 58 in the embodiment of FIGS. 13–15 are lengthened so that the cover can be positioned on top of upper housing part 102, with the cover still being mounted to the lower housing part 38 as seen in FIG. 15. In essence, the cover embraces the upper housing part and is mounted to the lower housing part to hold the upper part on the lower part. With the cover being fabricated of metal material, the cover provides a shield for the connector.

With card locating plate 48 pivotally mounted on lower housing part 38 as described with the previous embodiments, card receiving space 46 (FIG. 15) receives either an SD-type memory card or an XD-type memory card as described above. However, the card locating plate is spaced from roof 104 of upper housing part 102 to define a second card-receiving space 116 above the plate as seen in FIG. 15. The second card-receiving space receives a standard MS-type memory card.

Figure 16:
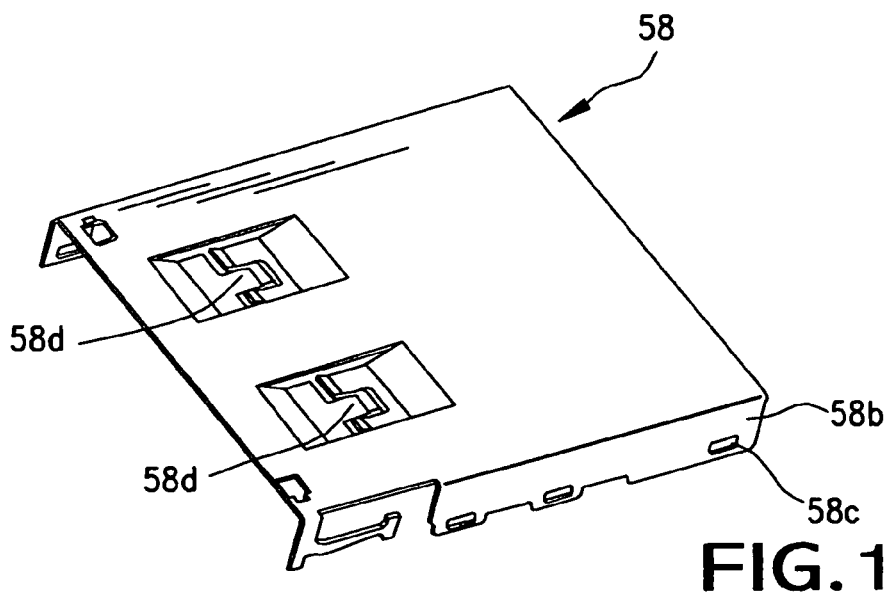
FIG. 16 is a top perspective view of a top cover according to a fourth embodiment of the invention.

FIG. 16 simply shows an embodiment of metal top cover 58 which includes a pair of spring biasing flanges 58b, versus the single spring biasing flange shown in FIGS. 2–4. Both spring biasing flanges 58b in FIG. 16 similarly operate to biasingly engage the front top of card locating/ejector plate 48.

Figure 17:
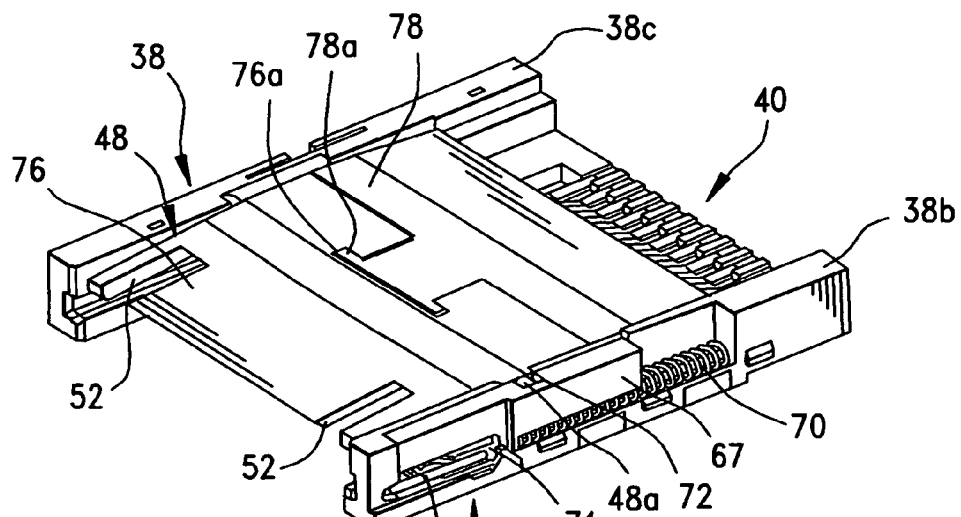
FIG. 17 is a top perspective view of a memory card connector according to a fifth embodiment of the invention, with the cover removed.
Figure 18:
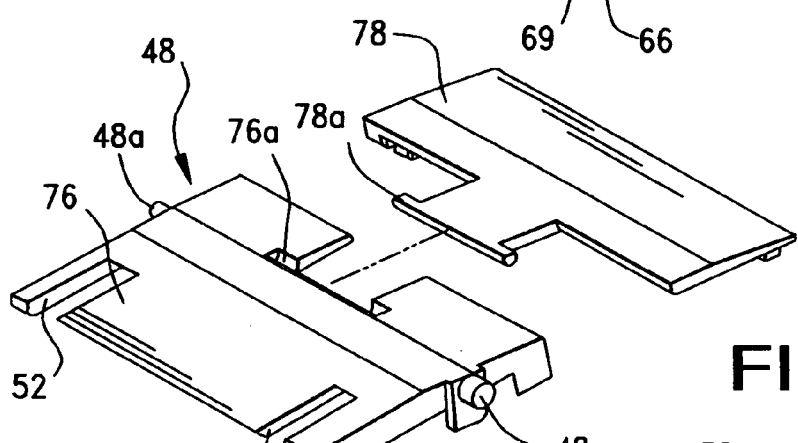
FIG. 18 is an exploded perspective view of the card locating plate of the fifth embodiment.
Figure 19:
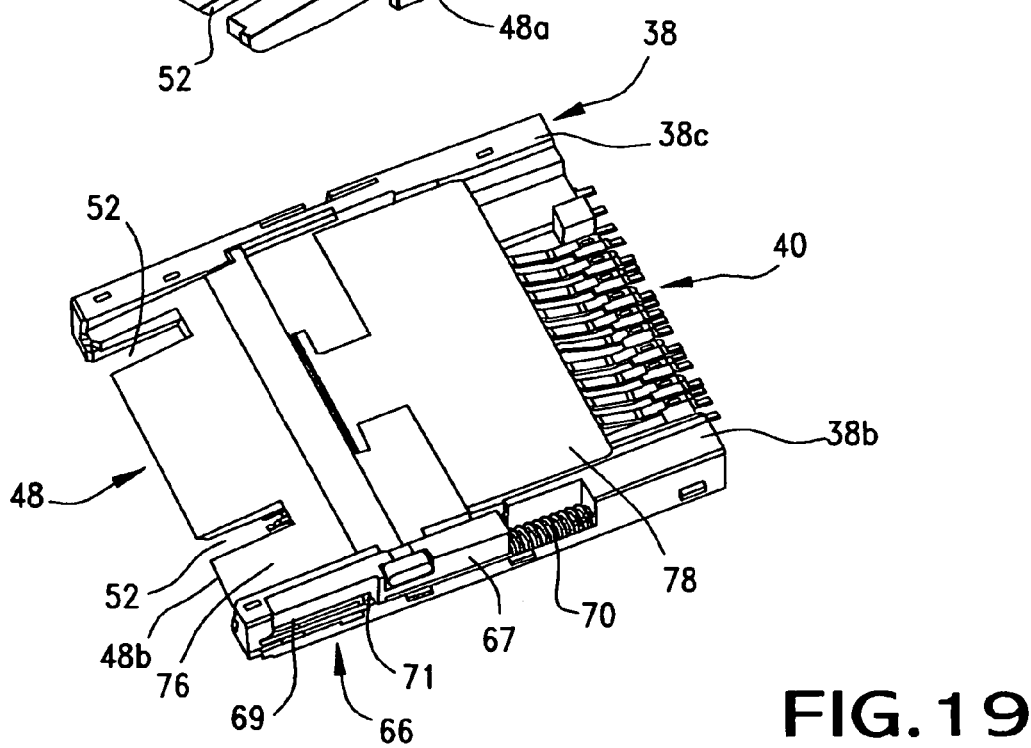
FIG. 19 is another top perspective view of the fifth embodiment.

FIGS. 17–19 show a fifth embodiment of the invention wherein card locating/ejector plate 48 is a two-part structure including a front part 76 and a rear part 78. The rear part has a T-shaped engagement section 78a which interengages with a T-shaped engagement notch 76a of front part 76. This interengagement pivotally mounts the rear part to the front part, while the front part has pivot posts 48a at opposite sides thereof, for purposes described above in relation to the previous embodiments of the invention. Pivot posts 48a define a first pivot axis, and engagement notch 76a defines a second pivot axis immediately behind the first pivot axis.

With the two-part card locating/ejector plate 48 of FIGS. 17–19, only the front part 48 of the plate pivots upwardly when a memory card 60, 62 or 64 is inserted into the connector. Since only the front part pivots, the rear part can be maintained in a fixed position beneath metal cover 58. As a result, the overall pivoting space of the plate is reduced which, in turn, decreases the overall height of the connector. The two-part plate can be used with the first embodiment of FIGS. 2–4 (i.e., without the eject mechanism).

Figure 20:
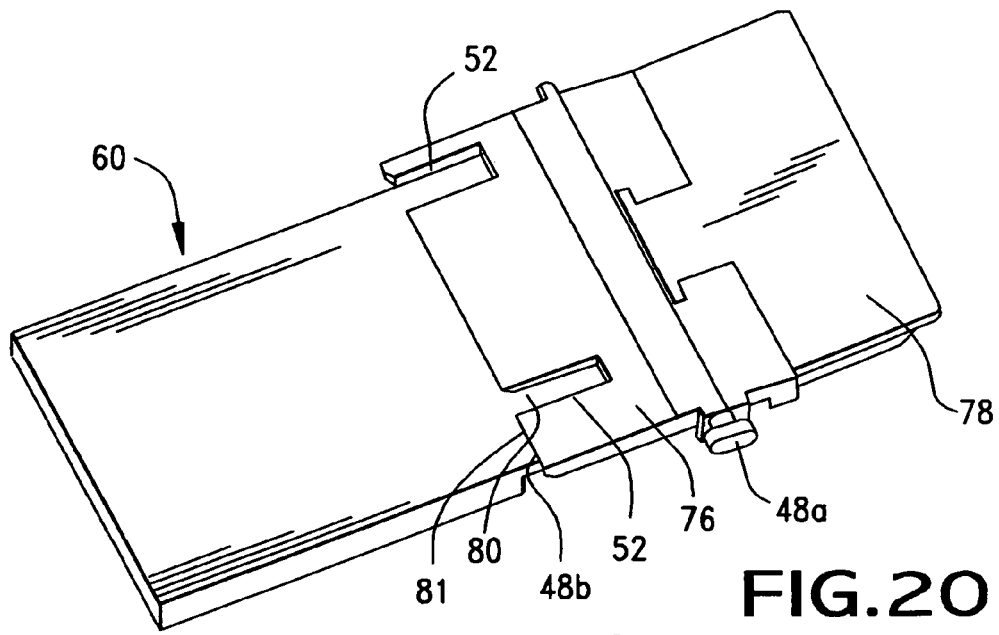
FIG. 20 is a top perspective view of the card locating plate of FIG. 18, receiving an MS-type memory card.
Figure 21:
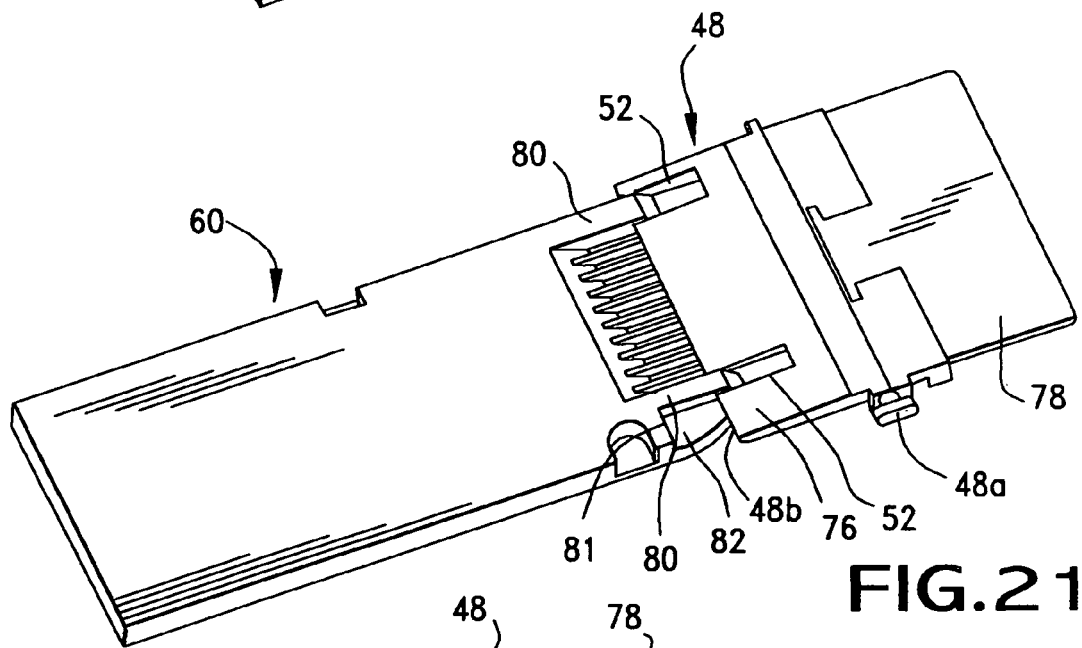
FIG. 21 is a view similar to that of FIG. 20, with the plate receiving the MS-type memory card in an incorrect orientation.

FIGS. 20 and 21 show an embodiment wherein card locating plate 48 has a pair of keying slots 52 in a front edge 48b of the plate. The MS-type memory card 60 includes a pair of keying ribs 80 on the underside thereof which will ride into keying slots 52 when the memory card is inserted incorrectly, such as in the upside-down orientation shown in FIG. 21. When the incorrectly oriented memory card is inserted into the receiving space of the connector, keying ribs 80 will bottom out and abut against the bottom of keying slots 52 to prevent the memory card from being further inserted which might damage the terminals of the connector. In addition, a stop wall 81 of a recess 82 will abut against front edge 48b of plate 48 to further prevent the incorrect oriented card from being inserted into the receiving space. Stop wall 81 is normally at the bottom of the card when the card is inserted correctly.

Figure 22:
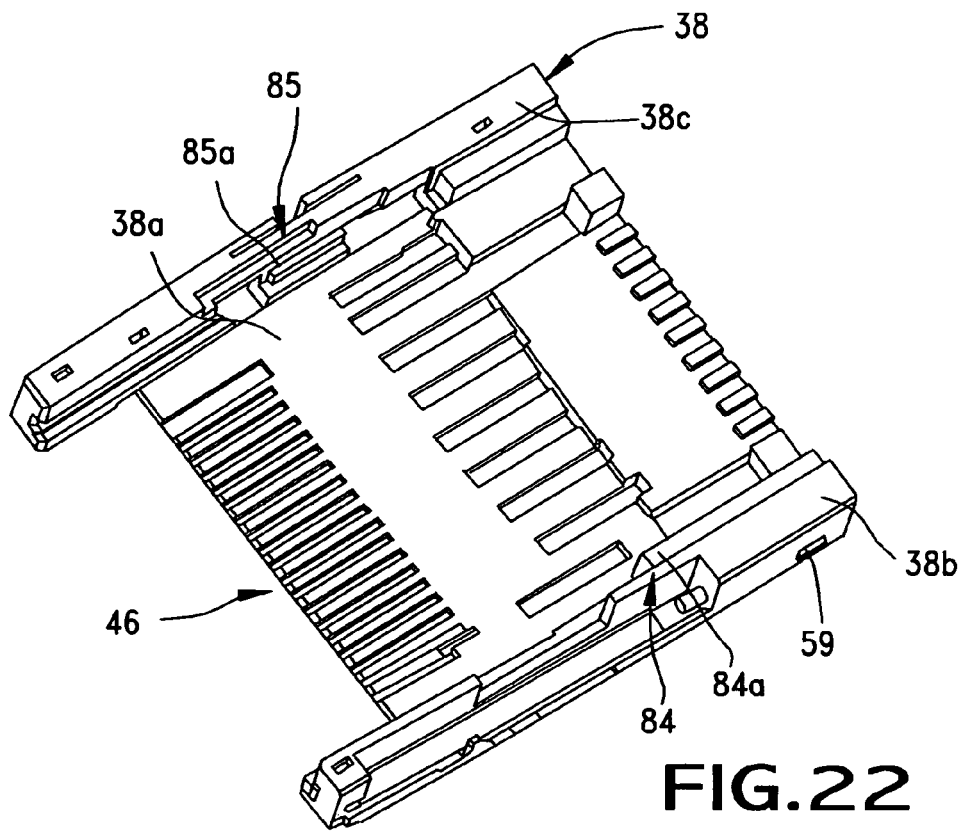
FIG. 22 is a bottom perspective view of the housing of the first embodiment of the invention.

Alternatively, FIG. 22 shows that dielectric housing 38 may be provided with stop or prevention elements, generally designated 84 and 85, with the stop elements having protrusions or stop ribs 84a and 85a, respectively. The SD-type memory card 62 has a keying groove in the bottom edge thereof as shown in FIGS. 6A and 6B. The XD-type memory card 64 has a keying groove 87 as seen in FIGS. 7A and 7B.

Figure 23:
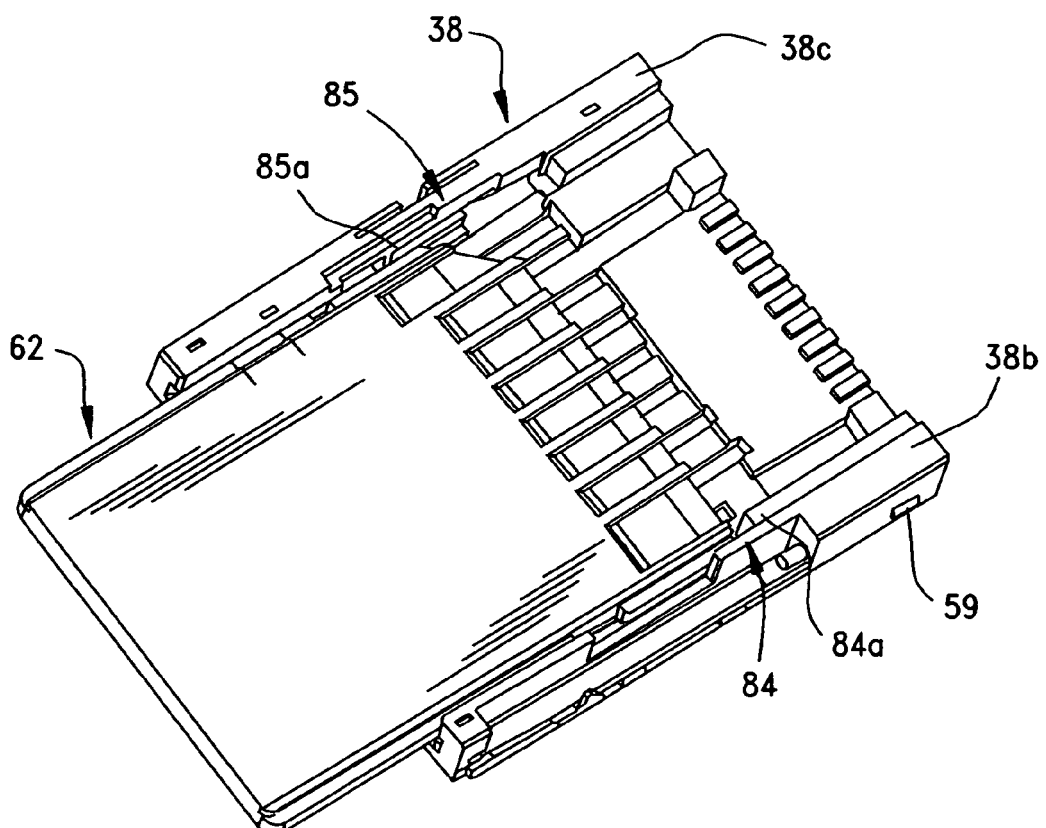
FIG. 23 is a view similar to that of FIG. 22, with an MS-type memory card inserted into the housing in an incorrect orientation.

When the SD-type memory card 62 is inserted incorrectly or upside-down as shown in FIG. 23, rib 84a will abut against the front edge of the card to prevent the card from being inserted in this incorrect orientation. If card 62 is inserted correctly, groove 86 (FIGS. 6A and 6B) will clear the rib and allow the card to be fully inserted.

Figure 24:
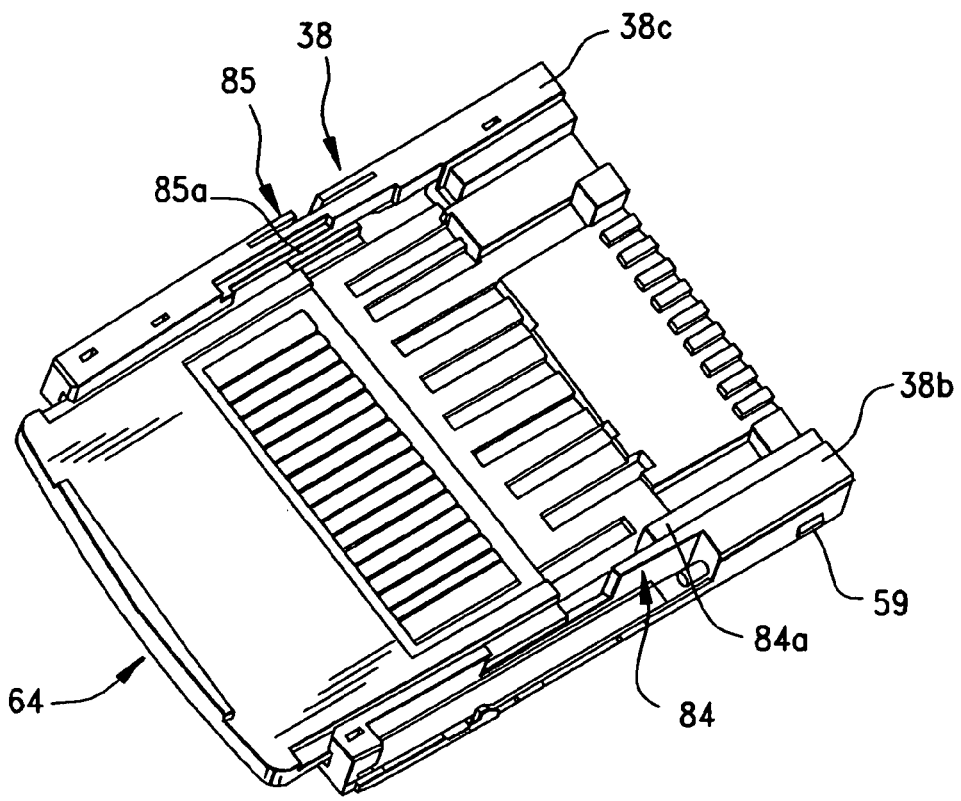
FIG. 24 is a view similar to that of FIG. 23, with an XD-type card inserted in an incorrect orientation.

Similarly, if the XD-type memory card 64 is inserted incorrectly or upside-down as shown in FIG. 24, rib 85a will abut against the front edge of the card to prevent the card from being inserted into the connector in the incorrect orientation. This protects the terminals of the connector.

Figure 25:
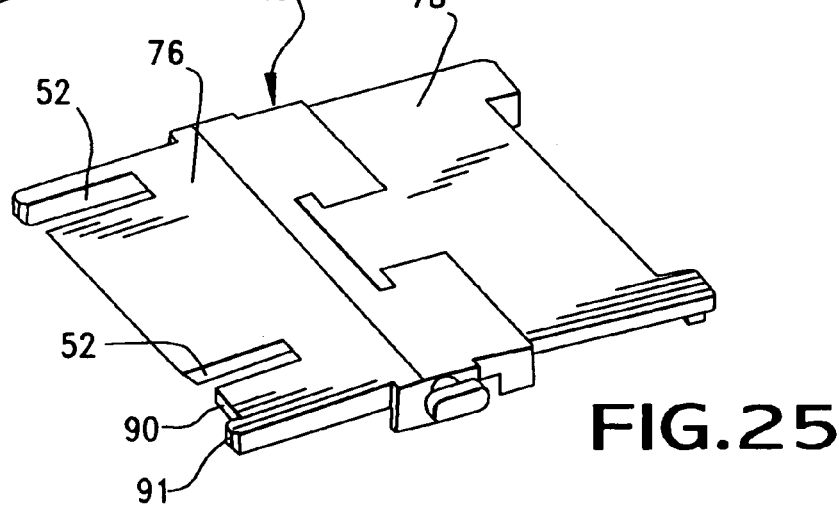
FIG. 25 is a top perspective view of a card locating plate according to a sixth embodiment of the invention.

FIGS. 25 and 26 show a slightly modified version of the card locating/ejector plate 48 versus the configuration shown in FIG. 21. In FIGS. 25 and 26, one front corner of the plate is formed with a prevention element in the form of a stop shoulder 90 inside a protrusion 91. When the MS-type-memory card 60 is inserted incorrectly or upside-down as shown in FIG. 26, stop shoulder 90 is a robust surface which abuts against stop shoulder 81 to prevent the incorrectly oriented card from being inserted into the connector.

Figure 28:
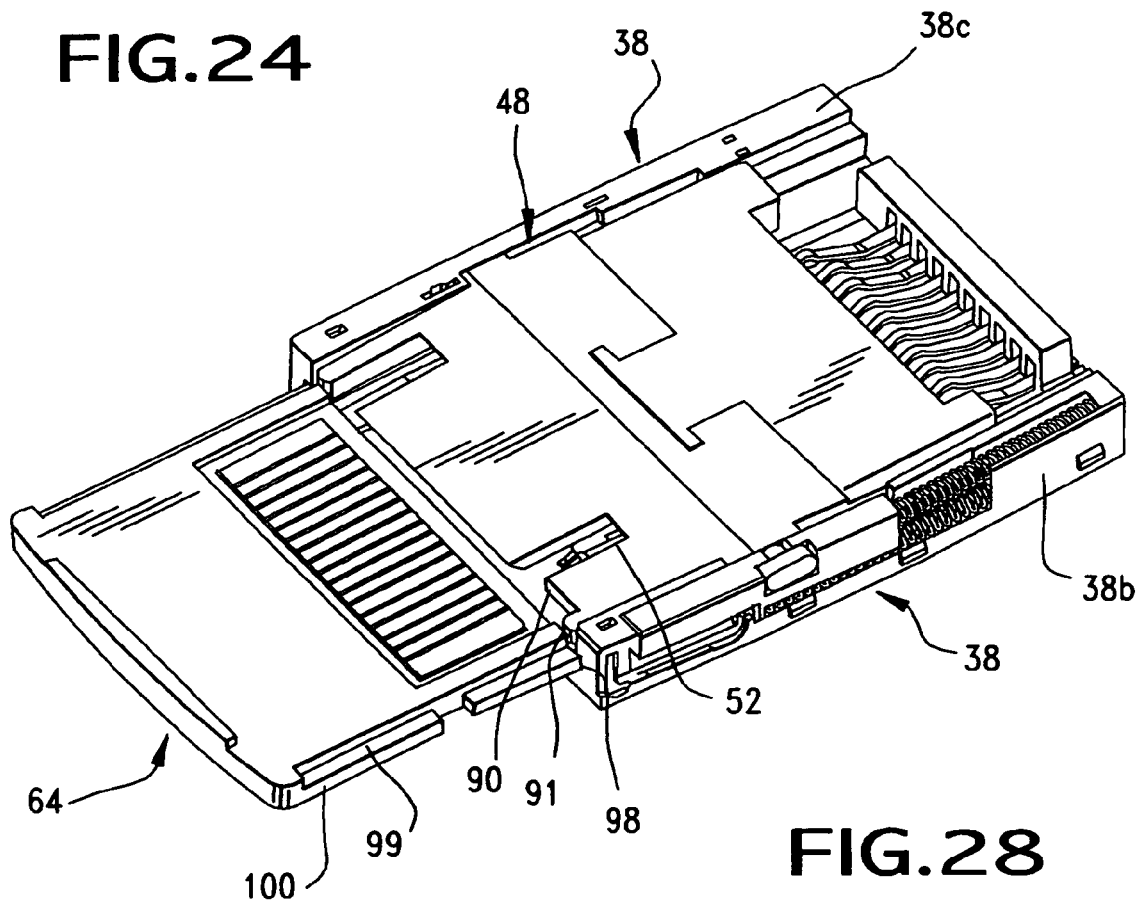
FIG. 28 is a view similar to that of FIG. 26, with the connector receiving an XD-type memory card in an incorrect orientation.

Finally, referring to FIGS. 27 and 28, the SD-type memory card 62 (FIG. 27) has grooves 96 extending along the opposite edges which define guide flanges 97 which ride within guide grooves 98 inside the opposite side wall sections 38b and 38c of dielectric housing 38, when the card is inserted into the connector in a correct orientation. However, when the SD-type card 62 is inserted incorrectly or upside-down as shown in FIG. 27, protrusion 91 on plate 48 abuts against a rim at the front edge of the card and prevents the card from being inserted incorrectly. When the card is inserted correctly, the rim extends downwardly into the bottom of the card receiving space.

Similarly, referring to FIG. 28, the XD-type memory card 64 has grooves 99 in opposite edges thereof to form guide ribs 100 which ride in guide grooves 98 of the housing when the card is inserted correctly into the connector. However, when the card is inserted incorrectly or upside-down as shown in FIG. 28, protrusion 91 on plate 48 abuts against a rim at the front edge of the card to prevent the card from being inserted into the connector in an incorrect orientation.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A memory card connector, comprising:
   a lower dielectric housing part having a terminal-mounting base and a pair of side wall sections extending forwardly from opposite sides of the base;
   an upper dielectric housing part mounted on top of the lower housing part and having a terminal-mounting roof; and
   a card locating plate connected at opposite sides thereof to the side wall sections of the lower housing part and combining therewith to define a first card-receiving space beneath the plate, and the card locating plate being spaced from the roof of the upper housing part and combining therewith to define a second card-receiving space above the plate.

2. The memory card connector of claim 1 wherein the terminal-mounting base of the lower housing part comprises a base plate mounting a group of terminals on the top thereof between the side wall sections of the housing for engaging appropriate contacts on a first memory card inserted into the first card-receiving space.

3. The memory card connector of claim 2 wherein said terminal-mounting roof of the upper housing part mounts a second group of terminals for engaging appropriate contacts on a second memory card inserted into the second card-receiving space.

4. The memory card connector of claim 2 wherein said base plate mounts two different groups of terminals for engaging appropriate contacts on two different types of memory cards.

5. The memory card connector of claim 4 wherein said terminal-mounting roof of the upper housing part mounts a third group of terminals for engaging appropriate contacts on a third memory card inserted into the second card-receiving space.

6. The memory card connector of claim 1 wherein said card locating plate is pivotally mounted at opposite sides thereof to the side wall sections of the lower housing part.

7. The memory card connector of claim 6 wherein said card locating plate includes a pair of pivot posts projecting from opposite sides thereof into a pair of respective pivot notches in the side wall sections of the housing.

8. The memory card connector of claim 7 wherein said pivot notches are elongated in a direction transversely of the card locating plate whereby the plate not only pivots relative to the housing, but the plate also moves bodily in said transverse direction.

9. The memory card connector of claim 1, including a cover embracing the upper housing part and mounted to the lower housing part to hold the upper housing part on the lower housing part.

10. The memory card connector of claim 9 wherein said cover is of metal material to provide a shield for the connector.

11. The memory card connector of claim 1, including a card eject mechanism on one of the side wall sections of the lower housing part, the eject mechanism including a movable slide member, and the card locating plate being coupled to the slide member for movement therewith, whereby the card locating plate can perform a function as a card ejection plate.

12. A memory card connector, comprising:
a lower dielectric housing part having a terminal-mounting base and a pair of side wall sections extending forwardly from opposite sides of the base, the base mounting a first group of terminals between the side wall sections of the housing for engaging appropriate contacts on a first type of memory card;
an upper dielectric housing part mounted on top of the lower housing part and having a terminal-mounting roof which mounts a second group of terminals for engaging appropriate contacts on a second type of memory card;
a card locating plate pivotally mounted at opposite sides thereof to the side wall sections of the lower housing part and combining therewith to define a first card-receiving space beneath the plate for insertion thereinto of the first type of memory card, and the card locating plate being spaced from the roof of the upper housing part and combining therewith to define a second card-receiving space above the plate for the insertion thereinto of the second type of memory card; and
a cover embracing the upper housing part and mounted to the lower housing part to hold the upper housing part on the lower housing part.

13. The memory card connector of claim 12 wherein said base mounts two different groups of terminals for engaging appropriate contacts on two different types of memory cards.

14. The memory card connector of claim 12 wherein said card locating plate includes a pair of pivot posts projecting from opposite sides thereof into a pair of respective pivot notches in the side wall sections of the housing.

15. The memory card connector of claim 14 wherein said pivot notches are elongated in a direction transversely of the card locating plate whereby the plate not only pivots relative to the housing, but the plate also moves bodily in said transverse direction.

16. The memory card connector of claim 12 wherein said cover is of metal material to provide a shield for the connector.

17. The memory card connector of claim 12, including a card eject mechanism on one of the side wall sections of the lower housing part, the eject mechanism including a movable slide member, and the card locating plate being coupled to the slide member for movement therewith, whereby the card locating plate can perform a function as a card ejection plate.

18. A memory card connector, comprising:
a lower dielectric housing part having a first group of terminals mounted thereon;
an upper dielectric housing part mounted on top of the lower housing part and having a terminal-mounting roof, with a second group of terminals mounted on the upper housing part; and
a card locating plate pivotally mounted at opposite sides thereof to the lower housing part and combining therewith to define a first card-receiving space beneath the plate for the insertion thereinto of a first memory card, and the card locating plate being spaced from the roof of the upper housing part and combining therewith to define a second card-receiving space above the plate for receiving a second memory card inserted thereinto.

19. The memory card connector of claim 18 wherein said lower housing part mounts two different groups of terminals for engaging appropriate contacts on two different types of memory cards.

20. The memory card connector of claim 18, including a cover embracing the upper housing part and mounted to the lower housing part to hold the upper housing part on the lower housing part.

21. The memory card connector of claim 20 wherein said cover is of metal material to provide a shield for the connector.

22. The memory card connector of claim 18, including a card eject mechanism on the lower housing part and including a movable slide member, with the card locating plate being coupled to the slide member for movement therewith, whereby the card locating plate can perform a function as a card ejection plate.

* * * * *